(12) United States Patent
Kojima et al.

(10) Patent No.: US 9,562,787 B2
(45) Date of Patent: Feb. 7, 2017

(54) TRAVEL GUIDANCE DEVICE, TRAVEL GUIDANCE METHOD, AND COMPUTER PROGRAM

(75) Inventors: Yusuke Kojima, Ebetsu (JP); Tomoya Umemura, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 313 days.

(21) Appl. No.: 13/291,527

(22) Filed: Nov. 8, 2011

(65) Prior Publication Data

US 2012/0123672 A1  May 17, 2012

(30) Foreign Application Priority Data

Nov. 15, 2010 (JP) ................................. 2010-255050

(51) Int. Cl.
*G01C 21/34* (2006.01)
*G01C 21/36* (2006.01)

(52) U.S. Cl.
CPC ....... *G01C 21/3658* (2013.01); *G01C 21/3647* (2013.01); *G01C 21/36* (2013.01)
USPC .......... 701/437; 701/431; 701/428; 701/435; 340/988; 340/995.2

(58) Field of Classification Search
USPC ....... 701/431, 437, 410, 435, 428, 441, 417, 701/436, 423, 310, 411–412; 340/988, 340/995.2, 995.21, 995.28, 995.24, 340/995.19, 428, 423, 95.19, 95.2, 438
See application file for complete search history.

(56) References Cited

U.S. PATENT DOCUMENTS 5,944,768 A * 8/1999 Ito et al. ........................ 701/418
6,577,246 B1 * 6/2003 Handa et al. ................. 340/901
(Continued)

FOREIGN PATENT DOCUMENTS

CN      1576792 A    7/2004
CN    101469992 A   12/2007
(Continued)

OTHER PUBLICATIONS

Automated lane guidance of commercial vehicles; Tomizuka, M. ; Tai, M. ; Wang, J.-Y. ; Hingwe, P.; Control Applications, 1999. Proceedings of the 1999 IEEE International Conference on; vol. 2; Digital Object Identifier: 10.1109/CCA.1999.801170 Publication Year: 1999 , pp. 1359-1364 vol. 2.*

(Continued)

*Primary Examiner* — Cuong H Nguyen
(74) *Attorney, Agent, or Firm* — Oliff PLC

(57) ABSTRACT

Travel guidance devices, methods, and programs acquire map data including a road network, a position of a vehicle, and a planned travel route of the vehicle. Based on the acquired information, the devices, methods, and programs determine whether there is a planned entry branch that the vehicle is projected to enter located ahead of the vehicle. When the planned entry branch is ahead of the vehicle, the devices, methods, and programs determine whether there is a no-lane-change zone between the vehicle and the planned entry branch. When the no-lane-change zone is located between the vehicle and the planned entry branch, the devices, methods, and programs set guidance content related to a lane change of the vehicle based on a position of the no-lane-change zone. The devices, methods, and programs generate guidance using the set guidance content and communicate the generated guidance to a user of the travel guidance device.

18 Claims, 6 Drawing Sheets

(56) References Cited

U.S. PATENT DOCUMENTS

| | | | |
|---|---|---|---|
| 7,437,240 B2* | 10/2008 | Oumi et al. | 701/533 |
| 7,734,415 B2* | 6/2010 | Oumi et al. | 701/417 |
| 7,788,030 B2* | 8/2010 | Kato et al. | 701/467 |
| 7,809,503 B2* | 10/2010 | Nakamura et al. | 701/414 |
| 7,974,780 B2* | 7/2011 | Nakayama et al. | 701/437 |
| 8,234,065 B2* | 7/2012 | Harayama et al. | 701/446 |
| 8,335,641 B2* | 12/2012 | Nakayama et al. | 701/408 |
| 8,676,499 B2* | 3/2014 | Tomita et al. | 701/428 |
| 8,831,876 B2* | 9/2014 | Hayashi | G01C 21/3438 340/905 |
| 2001/0049582 A1* | 12/2001 | Sakashita | 701/211 |
| 2002/0053984 A1* | 5/2002 | Yamashita et al. | 340/988 |
| 2004/0186663 A1* | 9/2004 | Irie | 701/211 |
| 2005/0261831 A1* | 11/2005 | Irie | 701/211 |
| 2006/0184321 A1* | 8/2006 | Kawakami et al. | 701/209 |
| 2007/0005240 A1* | 1/2007 | Oumi et al. | 701/209 |
| 2007/0005242 A1* | 1/2007 | Kato et al. | 701/211 |
| 2007/0088502 A1* | 4/2007 | Oumi et al. | 701/211 |
| 2007/0106470 A1* | 5/2007 | Nakayama | G01C 21/3629 701/437 |
| 2010/0063720 A1 | 3/2010 | Machino | |
| 2012/0016584 A1* | 1/2012 | Nakashima | 701/428 |
| 2012/0316775 A1* | 12/2012 | Hayashi et al. | 701/423 |
| 2013/0096829 A1* | 4/2013 | Kato et al. | 701/533 |

FOREIGN PATENT DOCUMENTS

| | | | |
|---|---|---|---|
| CN | 101750069 A | | 11/2008 |
| JP | A-07-192193 | | 7/1995 |
| JP | 9-081179 | * | 3/1997 |
| JP | 2000-37873 | * | 2/2000 |
| JP | A-2000-018956 | | 2/2000 |
| JP | 2000-167471 | * | 6/2000 |
| JP | 2003-78334 | * | 3/2003 |
| JP | 3430602 B2 | | 7/2003 |
| JP | 2005-317760 | * | 10/2005 |
| JP | 2007-127598 A | | 5/2007 |
| JP | A-2007-127416 | | 5/2007 |
| JP | 2009-298075 | * | 12/2009 |
| JP | 2009-298076 | * | 12/2009 |
| WO | WO00/72288 | * | 11/2000 |
| WO | WO2006/070785 | * | 6/2006 |
| WO | WO2011/081159 | * | 7/2011 |

OTHER PUBLICATIONS

Virtual Mid-Line Detection on Curve Road for User Guidance Using Simulation Model; Faizal, E.R.M. ; Mansor, H.M.A.H. Computer Technology and Development, 2009. ICCTD '09. International Conference on; vol. 1; Digital Object Identifier: 10.1109/ICCTD.2009.210; Publication Year: 2009 , pp. 24-27.*

Driver Assistance System Using Integrated Information from Lane Geometry and Vehicle Direction; Chan-Yu Huang ; Shih-Shinh Huang ; Yi-Ming Chan ; Yi-Hang Chiu ; Li-Chen Fu ; Pei-Yung Hsiao; Intelligent Transportation Systems Conf., 2007. ITSC 2007. IEEE; Digital Obj. Id: 10.1109/ITSC.2007.4357747; Pub. Yr: 2007 , pp. 986-991.*

Lane guidance warning system; Lee Kim Kuan ; Ismail, N.H. ; Rahman, T.S.A. ; Saadon, E.I.S.; Computer and Communication Engineering (ICCCE), 2012 International Conference on; Digital Object Identifier: 10.1109/ICCCE.2012.6271339 Publication Year: 2012 , pp. 864-868.*

Routes for Splitting and Merging Maneuvers of Platoon Followers in Urban Environments; Valdés, F. ; Espinosa, F. ; Awawdeh, A.M.H. ; Pastor, J.; Emerging Technologies and Factory Automation, 2006. ETFA '06. IEEE Conference on Digital Object Identifier: 10.1109/ETFA.2006.355236; Publication Year: 2006 , pp. 1153-1156.*

Lane recognition system for guiding of autonomous vehicle; Suzuki, A.; Yasui, N.; Nakano, N.; Kaneko, M. Intelligent Vehicles '92 Symposium., Proceedings of the; Digital Object Identifier: 10.1109/IVS.1992.252256 Publication Year: 1992 , pp. 196-201.*

Variable analysis for freeway work zone capacity prediction; Nan Zheng; Andreas Hegyi; Serge P. Hoogendoorn; Henk van Zuylen; David Peters; Intelligent Transportation Systems (ITSC), 2010 13th International IEEE Conference on; Year: 2010; pp. 831-836, DOI: 10.1109/ITSC.2010.5625199.*

Research on anticipatory route guidance; Kan Chen; S. E. Underwood; Vehicle Navigation and Information Systems Conference, 1991; Year: 1991, vol. 2; pp. 427-439, DOI: 10.1109/VNIS.1991.205790.*

A novel multi-lane detection and tracking system; Kun Zhao; Mirko Meuter; Christian Nunn; Dennis Müler; Stefan Müler; chneiders; Josef Pauli; Intelligent Vehicles Symposium (IV), 2012 IEEE; Year: 2012; pp. 1084-1089, DOI: 10.1109/IVS.2012.6232168.*

Highly Automated Driving on Freeways in Real Traffic Using a Probabilistic Framework; Michael Ardelt; Constantin Coester; Nico Kaempchen; IEEE Transactions on Intelligent Transportation Systems; Year: 2012, vol. 13, Issue: 4; pp. 1576-1585, DOI: 10.1109/TITS.2012.2196273.*

Japanese Patent Office, Notification of Reason(s) for Refusal mailed Feb. 4, 2014 in Japanese Patent Application No. 2010-255050 w/partial English-language Translation.

May 10, 2016 Search Report issued in European Patent Application No. 11186708.1.

* cited by examiner

FIG. 5

GUIDANCE CONTENT DETERMINATION TABLE 32

| GUIDANCE TIMING DISTANCE N | FIRST GUIDANCE CONTENT (FIRST DISTANCE) | SECOND GUIDANCE CONTENT (SECOND DISTANCE) |
|---|---|---|
| N < SECOND DISTANCE | NORMAL BRANCH GUIDANCE + LANE CHANGE EARLY INSTRUCTION GUIDANCE | NORMAL BRANCH GUIDANCE + LANE CHANGE EARLY INSTRUCTION GUIDANCE |
| SECOND DISTANCE ≤ N < FIRST DISTANCE | NORMAL BRANCH GUIDANCE + LANE CHANGE EARLY INSTRUCTION GUIDANCE | ONLY NORMAL BRANCH GUIDANCE |
| FIRST DISTANCE ≤ N | NORMAL BRANCH GUIDANCE + LANE CHANGE EARLY INSTRUCTION GUIDANCE + GUIDANCE TIMING CHANGE | ONLY NORMAL BRANCH GUIDANCE |
| NO-LANE-CHANGE ZONE: NONE | ONLY NORMAL BRANCH GUIDANCE | ONLY NORMAL BRANCH GUIDANCE |

FIG. 6
GUIDANCE TIMING DISTANCE < SECOND DISTANCE
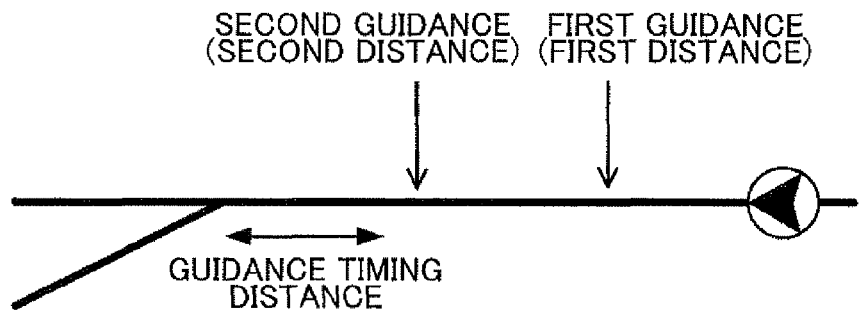
SECOND DISTANCE ≤ GUIDANCE TIMING DISTANCE
< FIRST DISTANCE
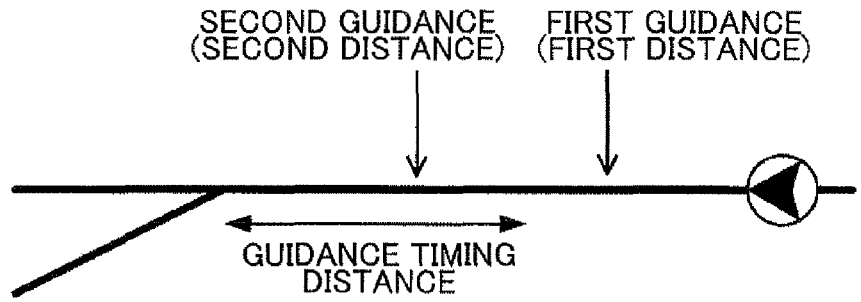
FIRST DISTANCE ≤ GUIDANCE TIMING DISTANCE
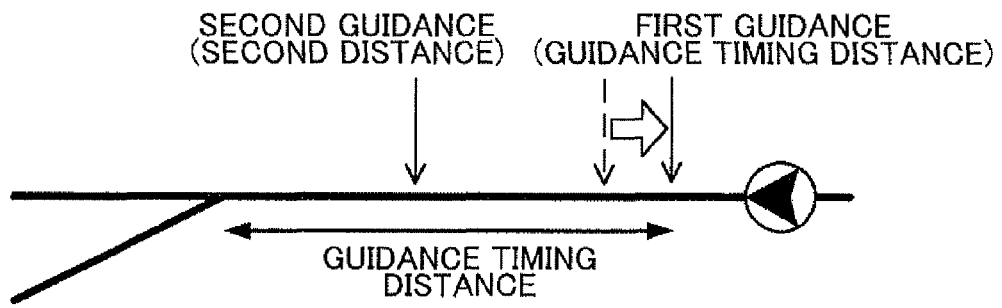

TRAVEL GUIDANCE DEVICE, TRAVEL GUIDANCE METHOD, AND COMPUTER PROGRAM

INCORPORATION BY REFERENCE

The disclosure of Japanese Patent Application No. 2010-255050, filed on Nov. 15, 2010, including the specification, drawings, and abstract is incorporated herein by reference in its entirety.

BACKGROUND

1. Related Technical Fields

Related technical fields travel guidance devices, travel guidance methods, and computer programs which perform guidance of vehicle-related travel.

2. Related Art

Recently, navigation devices that perform vehicle travel guidance so that a driver can reach a desired destination easily are often installed in vehicles. Here, a navigation device is a device which is capable of detecting the current position of a vehicle using a GPS receiver or the like, obtaining map data corresponding to the current position from a recording medium such as a DVD-ROM or an HDD, and displaying the obtained map data on a liquid crystal monitor. The map data including the current position of the vehicle are read from the recording medium or the like, and on the basis of the map data, a map image of the periphery of the current vehicle position is drawn and displayed on a display device. At the same time, a vehicle position mark is superposed on the map image, and as the vehicle moves, the map image is scrolled, or the map image is fixed on the screen and the vehicle position mark is moved. Thus, the current location of the moving vehicle can be learned at a glance. The navigation device above includes a route search function that, when a desired destination is set, searches for an optimal route from a departure point (e.g., the current vehicle position) to the set destination, and further includes a travel guidance function that provides guidance for traveling along the route found. In recent years, mobile telephones, personal digital assistants (PDAs), personal computers and the like often have functions similar to the navigation device above.

Moreover, when the navigation device and the like above perform vehicle travel guidance, such guidance takes into account a zone where the vehicle is prohibited from changing lanes (hereinafter referred to as a "no-lane-change zone"). For example, according to art described in Japanese Patent Application Publication No. JP-A-2007-127416 (pages 8 to 11, FIG. 2), a position of a guidance target point for providing guidance, such as turning right or left at a guided intersection, is offset toward a near side by a distance that corresponds to the length of a no-lane-change zone if there is a no-lane-change zone between the guidance target point and the guided intersection.

SUMMARY

However, according to the art described in JP-A-2007-127416, although the guidance target point is offset to the near side (i.e., the guidance is performed at an earlier timing) in consideration of the no-lane-change zone when there is a no-lane-change zone, the content of the guidance does not change in consideration of the no-lane-change zone.

Exemplary implementations of the broad inventive principles described herein provide a travel guidance device, a travel guidance method, and a computer program which, when performing guidance for a lane change of a vehicle, can perform lane change guidance using suitable guidance content that takes into consideration a no-lane-change zone.

Exemplary implementations perform lane change guidance using suitable guidance content that takes into consideration a no-lane-change zone when performing guidance for a lane change of a vehicle. Thus, if the vehicle must change lanes in order to enter a planned entry branch, a suitable lane change can be made.

According to exemplary implementations, the guidance content may be set in consideration of a guidance timing distance, which is a distance from the planned entry branch that is required for the vehicle to comfortably change lanes before entering the no-lane-change zone. Therefore, the lane change guidance can be performed using suitable guidance content. Thus, if the vehicle must change lanes in order to enter the planned entry branch, a suitable lane change can be made.

According to exemplary implementations, if guidance is performed in the two stages of a first guidance and a second guidance, whether to perform the guidance related to a lane change in each guidance may be set in consideration of the guidance timing distance, which is the distance from the planned entry branch that is required for the vehicle to comfortably change lanes before entering the no-lane-change zone. Therefore, the guidance related to a lane change is not performed at an unnecessary timing, and can be performed at a necessary timing.

According to exemplary implementations, even if the guidance timing distance, which is the distance from the planned entry branch that is required for the vehicle to comfortably change lanes before entering the no-lane-change zone, is a particularly long distance, the guidance related to a lane change may be performed at a timing before the vehicle enters the no-lane-change zone. Therefore, if the vehicle must change lanes in order to enter the planned entry branch, a suitable lane change can be made.

BRIEF DESCRIPTION OF THE DRAWINGS

FIG. 5 is a drawing that shows an example of a guidance content determination table; and FIG. 6 is a drawing that shows guidance modes of a first guidance and a second guidance.

DETAILED DESCRIPTION OF EXEMPLARY IMPLEMENTATIONS

Figure 1:
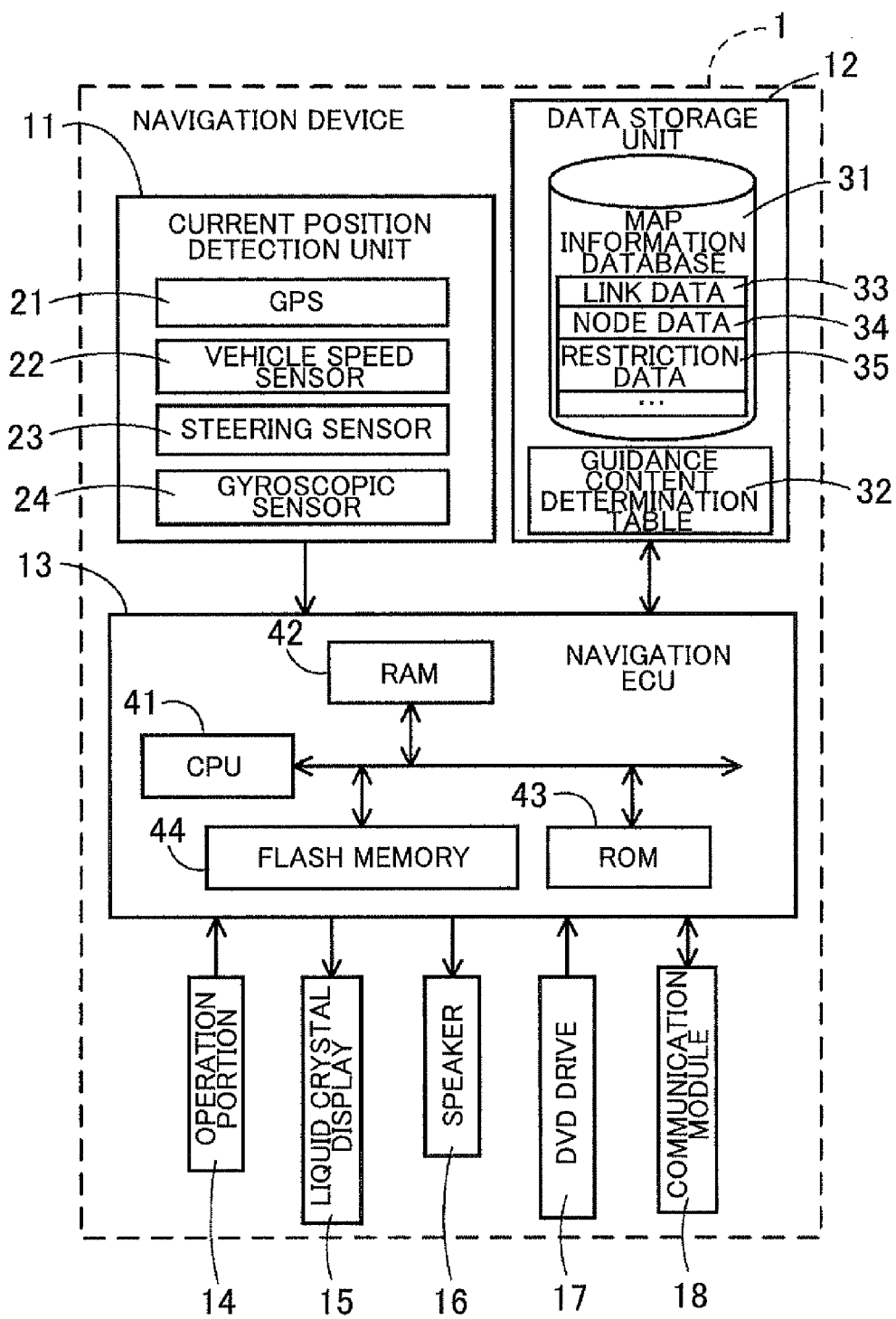
FIG. 1 is a block diagram that shows a navigation device according to an example.

A specific example of a travel guidance device that is realized in a navigation device will be described in detail below with reference to the drawings. First, an overall configuration of a navigation device 1 will be explained using FIG. 1. FIG. 1 is a block diagram that shows the navigation device 1 according to the present example.

As shown in FIG. 1, the navigation device 1 according to the present example includes a current position detection unit 11 that detects a current position of a vehicle installed with the navigation device 1; a data storage unit 12 that stores various types of data; a controller (e.g., navigation ECU 13) that performs various types of computational processing based on input information; an operation portion 14 that receives an operation from a user; a liquid crystal display 15 that displays a map of the vehicle's surroundings and facility information pertaining to facilities for the user; a speaker 16 that outputs voice guidance pertaining to route guidance; a DVD drive 17 that reads a DVD serving as a storage medium; and a communication module 18 that performs communication with an information center such as a probe center or the VICS® (Vehicle Information and Communication System) center.

Each of the configuring elements of the navigation device 1 will be explained in order below.

The current position detection unit 11 includes a GPS 21, a vehicle speed sensor 22, a steering sensor 23, and a gyroscopic sensor 24. The current position detection unit 11 is capable of detecting the vehicle's current position, heading, and running speed, as well as the current time and the like. The vehicle speed sensor 22, in particular, is a sensor for detecting the vehicle's speed and distance traveled. The vehicle speed sensor 22 generates a pulse in response to the rotation of the vehicle's drive wheels and outputs a pulse signal to the navigation ECU 13. The navigation ECU 13 counts the generated pulses to compute the revolution speed of the drive wheels and the distance traveled. Note that it is not necessary for the navigation device 1 to be provided with all of the four types of sensors described above, and it is acceptable for the navigation device 1 to be provided with only one or a plurality among the four types of sensors.

The data storage unit 12 includes a hard disk (not shown in the drawing) that serves as an external storage device and recording medium, and a read/write head (not shown in the drawing) that serves as a drive for reading a map information database 31, a guidance content determination table 32, predetermined programs, and so on from the hard disk and writing predetermined data to the hard disk. Instead of a hard disk, the data storage unit 12 may also be configured from an optical disk such as a memory card, a CD, or a DVD.

Here, the map information database 31 is a storage unit that stores, for example, link data 33 pertaining to roads (links), node data 34 pertaining to node points, restriction data 35 pertaining to various types of restrictions set on the roads, point data pertaining to points such as facilities, map display data for displaying a map, intersection data pertaining to intersections, search data for finding routes, and search data for finding points. Note that the link data 33 also include information pertaining to road types (e.g., expressways, general roads, and narrow city streets), and the number of lanes on the roads.

Here, the restriction data 35 store data pertaining to various types of restrictions set on the roads, such as information pertaining to zones where vehicle lane changes are prohibited (hereinafter referred to as "no-lane-change zones") and no passage zones. The restriction data 35 pertaining to no-lane-change zones also store information that specifies the range (start and end points) of each no-lane-change zone.

The guidance content determination table 32 is a table in which guidance timing distances are associated with guidance contents related to a lane change. The guidance timing distance and the guidance content determination table 32 will be described in more detail later. As also described later, if there is a branch that the vehicle is projected to enter ahead in an advancing direction of the vehicle and there is a no-lane-change zone between the vehicle and the branch, the navigation ECU 13 calculates the guidance timing distance and performs guidance related to a lane change using the guidance content set based on the calculated guidance timing distance and the guidance content determination table 32.

Figure 2:
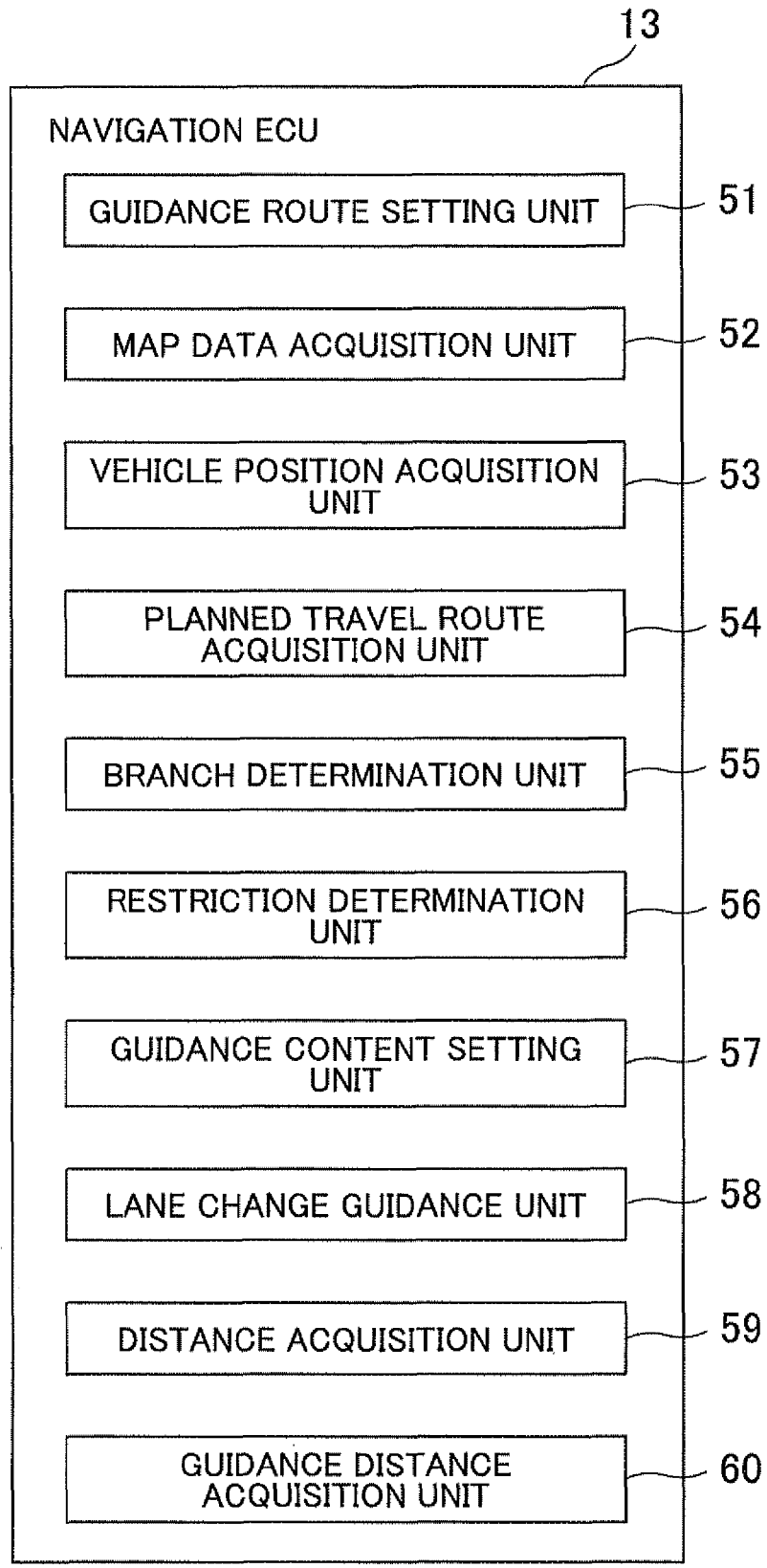
FIG. 2 is a drawing that shows various units configured by a navigation ECU.

The navigation ECU 13 is an electronic control unit that performs an overall control of the navigation device 1. The navigation ECU 13 includes a CPU 41 that serves as a computational device and a control device; a RAM 42 that is used as a working memory when the CPU 41 performs various types of computational processing, and also stores route data and the like when a route is found; a ROM 43 that stores control programs as well as a travel guidance processing program described later (see FIG. 3); and an internal storage device such as a flash memory 44 that stores programs read from the ROM 43. Note that the navigation ECU 13 configures various units shown in FIG. 2 that act as processing algorithms. For example, a guidance route setting unit 51 sets a guidance route from a departure point to a destination. A map data acquisition unit 52 acquires map data that include a road network from the map information database 31. A vehicle position acquisition unit 53 acquires a position of the vehicle, and a planned travel route acquisition unit 54 acquires a route that the vehicle is projected to travel. Based on the vehicle position, the planned travel route, and the map data, a branch determination unit 55 determines whether there is a planned entry branch, which is a branch that the vehicle is projected to enter, located ahead in the advancing direction of the vehicle among the branches of the road network. A restriction determination unit 56 determines whether there is a no-lane-change zone specified in the road network between the vehicle and the planned entry branch based on the map data, if the branch determination unit 55 determines that there is a planned entry branch located ahead in the advancing direction of the vehicle. A guidance content setting unit 57 sets the guidance content related to a lane change of the vehicle based on the location of the no-lane-change zone, if the restriction determination unit 56 determines that there is a no-lane-change zone between the vehicle and the planned entry branch. A lane change guidance unit 58 performs guidance using the set guidance content. A distance acquisition unit 59 acquires a distance from the planned entry branch to a vehicle-side end of the no-lane-change zone as a no-lane-change start distance, and a guidance distance acquisition unit 60 acquires a distance from the vehicle to the planned entry branch.

The operation portion 14 is operated at times such as when the departure point is input as a travel start point and the destination is input as a travel end point, and includes a plurality of operation switches (not shown in the drawing), such as various types of keys, buttons, and the like. Based on switch signals that are output by operating the various operation switches, such as by pressing or the like, the navigation ECU 13 controls the various types of corresponding operations that are executed. Note that the operation portion 14 can also be configured as a touch panel that is provided on the front surface of the liquid crystal display 15. In addition, the operation portion 14 may be configured by a microphone and a voice recognition device.

The liquid crystal display 15 displays a map image that includes roads, traffic information, operation guidance, an operation menu, key guidance, a planned travel route from the departure point to the destination, guidance information along the planned travel route, news, a weather forecast, the time, e-mail, a television program, and the like. In particular, according to the present example, if there is a planned entry branch that is a branch on an expressway or the like that the vehicle is projected to enter located ahead in the advancing direction of the vehicle, an enlarged view of the vicinity of the entry branch point is also displayed.

The speaker 16 outputs traffic information guidance and voice guidance for guiding travel along the planned travel route on the basis of an instruction from the navigation ECU 13. In particular, according to the present example, if there is a planned entry branch that is a branch on an expressway or the like that the vehicle is projected to enter located ahead in the advancing direction of the vehicle, voice guidance related to a lane change is also output.

The DVD drive 17 is a drive capable of reading data stored on a recording medium such as a DVD or a CD. Music and videos are played, and the map information database 31 is updated and the like based on the data that is read.

The communication module 18 is a communication device, such as a mobile telephone or a DCM, for example, that receives traffic information that is transmitted from a traffic information center, such as the VICS center, a probe center, or the like. The traffic information includes various types of information, such as congestion information, restriction information, and traffic accident information.

Figure 3:
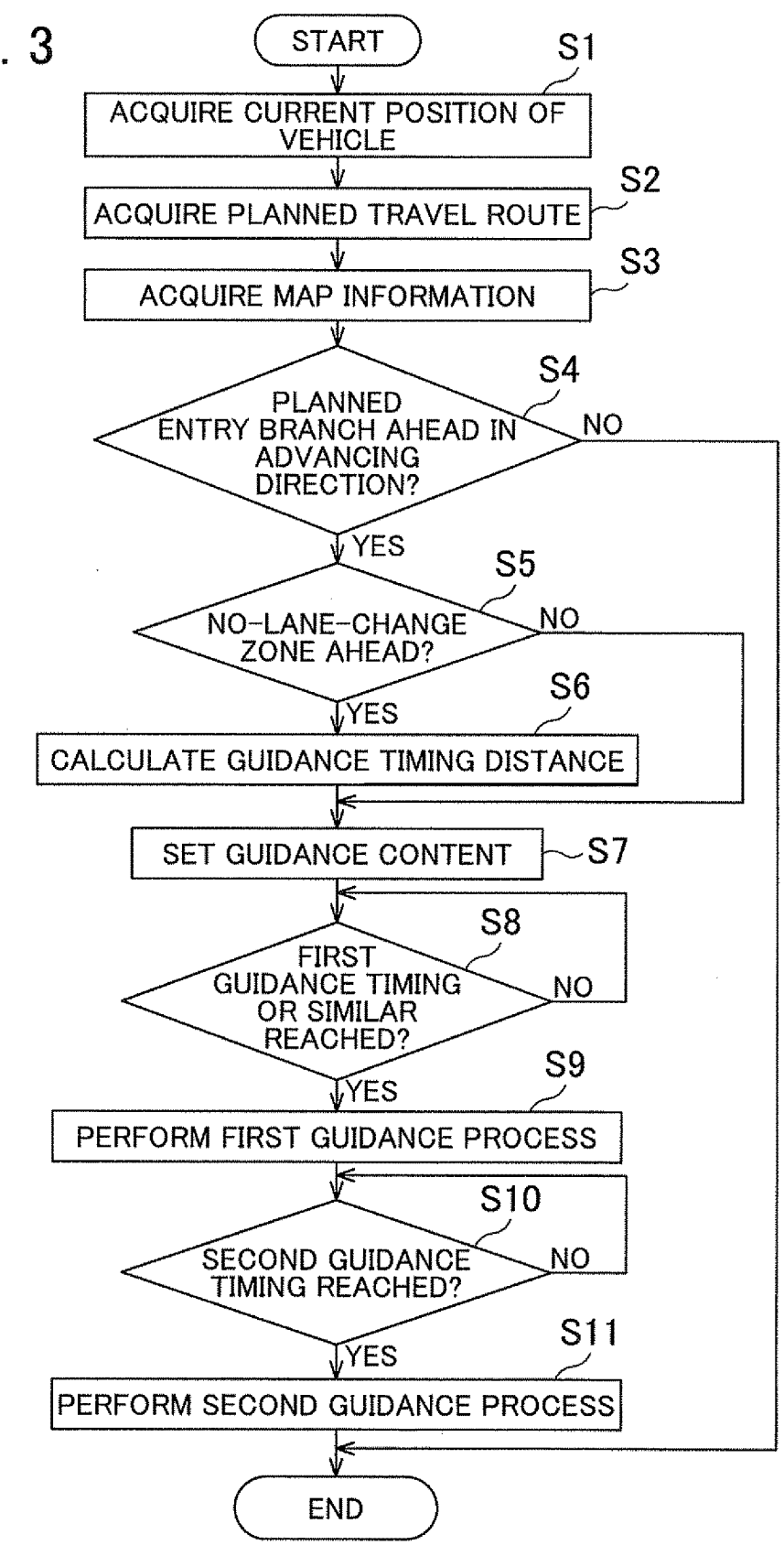
FIG. 3 is a flowchart of a travel guidance processing algorithm according to the example.

Next, an example of a travel guidance processing method will be explained based on the algorithm shown in FIG. 3. The method may be implemented by a computer program stored in the RAM 42, ROM 43, and/or flash memory 44 that is executable by the CPU 41. Although the structure of the above-described navigation device 1 is referenced in the description of the method, the reference to such structure is exemplary, and the method need not be limited by the specific structure of the above-described navigation device 1.

Here, the travel guidance processing program is executed after the navigation device 1 is turned on, and performs vehicle travel guidance based on the guidance route set by the navigation device 1. Note that the program shown in the flowchart of FIG. 3 is stored in the RAM 42 or the ROM 43 that are provided in the navigation device 1 and is executed by the CPU 41.

In the travel guidance processing program, first, the CPU 41 acquires the current position of the vehicle based on a detection result of the current position detection unit 11 at step (hereinafter abbreviated as "S") 1. Note that map matching processing is also performed to specify the current position of the vehicle on the map data.

Next, at S2, the CPU 41 acquires the planned travel route of the vehicle. Specifically, the guidance route set in the navigation device 1 corresponds to the planned travel route. Note that the guidance route is a route set as a recommended route in the navigation device 1 as a result of the navigation device 1 searching for routes from a departure point (e.g., the current position of the vehicle) to a destination selected by the user. Details of the route search processing are commonly known and not included here. Further note that, instead of the guidance route set in the navigation device 1, the planned travel route of the vehicle may be acquired based on a lighting state of a direction indicator of the vehicle, a past travel history of the vehicle, and the like.

At S3, the CPU 41 acquires map information of the vehicle position surroundings from the map information database 31. Note that, at S3, the restriction data 35 may also be acquired in addition to the link data 33 and the node data 34.

At S4, based on the current position of the vehicle acquired at S1, the planned travel route of the vehicle acquired at S2, and the map information acquired at S3, the CPU 41 determines whether there is a branch that the vehicle is projected to enter (hereinafter referred to as a "planned entry branch") located ahead (e.g., within 3,000 meters) in the advancing direction of the vehicle. In the present example, particularly for expressways (e.g., national expressways, motor roads, and urban expressways), a branch to an access road by which the vehicle enters an SA (service area), PA (parking area), IC (interchange) or the like from a main road is considered a planned entry branch.

If it is determined that there is a planned entry branch located ahead in the advancing direction of the vehicle (S4: Yes), the CPU 41 proceeds to S5. However, if it is determined that there is no planned entry branch located ahead in the advancing direction of the vehicle (S4: No), the travel guidance processing program is ended.

At S5, the CPU 41 determines whether there is a no-lane-change zone between the vehicle and the planned entry branch located ahead in the advancing direction of the vehicle based on the map information acquired at S3, and the restriction data 35 in particular.

If it is determined that there is a no-lane-change zone between the vehicle and the planned entry branch located ahead in the advancing direction of the vehicle (S5: Yes), the CPU 41 proceeds to S6. However, if it is determined that a no-lane-change zone does not exist between the vehicle and the planned entry branch located ahead in the advancing direction of the vehicle (S5: No), the CPU 41 proceeds to S7.

At S6, the CPU 41 calculates the guidance timing distance. Here, the guidance timing distance is a distance from the planned entry branch that is required for the vehicle to comfortably change lanes before entering the no-lane-change zone. The guidance timing distance is calculated using Equation (1) below.

$$N = L + M \quad (1)$$

where,

N: guidance timing distance;

L: no-lane-change start distance; and

M: distance required for vehicle to comfortably change lanes.

Figure 4:
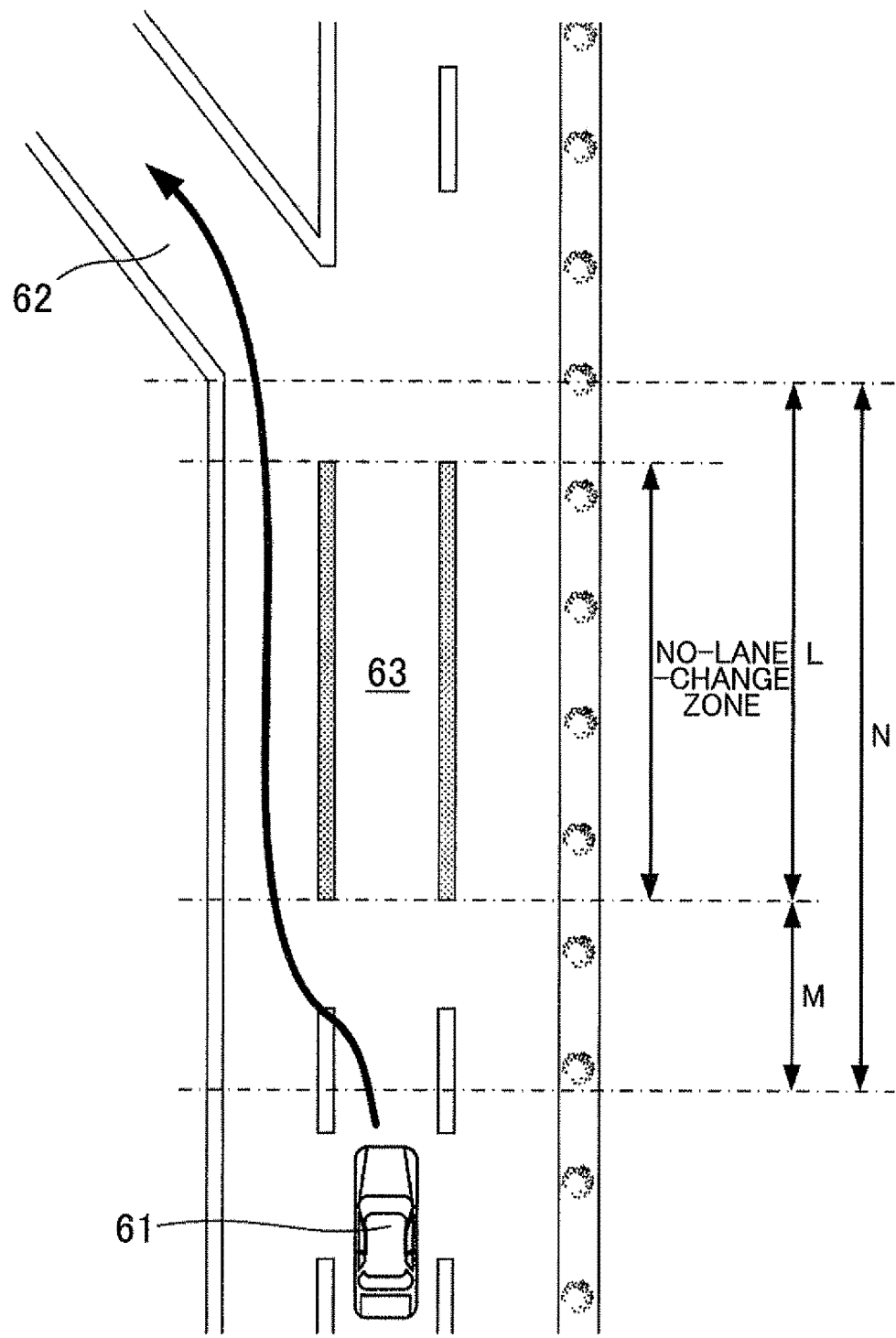
FIG. 4 is a drawing that shows a vehicle entering a planned entry branch.

The no-lane-change start distance L is the distance from the planned entry branch located ahead in the advancing direction of the vehicle to the vehicle-side end of the no-lane-change zone. For example, as shown in FIG. 4, a vehicle 61 is traveling on a road with three lanes in each direction. There is a planned entry branch 62 ahead in the advancing direction of the vehicle 61, and there is a no-lane-change zone 63 between the vehicle 61 and the planned entry branch 62. In this case, the no-lane-change start distance L is the distance from the planned entry branch 62 to the end of the no-lane-change zone 63 on the vehicle 61 side.

The distance M required for the vehicle to comfortably change lanes is a value based on the number of lanes on the road traveled by the vehicle, and calculated using Equation (2) below.

$$M = V \times (T \times S + H) \quad (2)$$

where,

V: vehicle speed (m/s);

T: number of lanes on road traveled by vehicle;

S: time required to move between lanes (sec); and

H: prescribed time (sec).

Note that V, S, and H in Equation (2) above may be fixed values, or vary depending on the vehicle model or road type. For example, V=20 m/s, S=9 sec, and H=4 sec.

Next, at S7, the CPU 41 sets the guidance content related to a lane change based on the guidance timing distance calculated at S6. Specifically, using the guidance content determination table 32 stored in the data storage unit 12, the CPU 41 sets the guidance content that corresponds to the guidance timing distance calculated at S6. In addition, at S7, the CPU 41 sets both guidance content (hereinafter referred to as "first guidance content") for guidance (hereinafter referred to as a "first guidance") performed at a timing (hereinafter referred to as a "first guidance timing") at which the distance from the vehicle to the planned entry branch equals a prescribed first distance (e.g., 1,000 meters), and guidance content (hereinafter referred to as "second guidance content") for guidance (hereinafter referred to as a "second guidance") performed at a timing (hereinafter referred to as a "second guidance timing") at which the distance from the vehicle to the planned entry branch equals a second distance shorter than the first distance (e.g., 500 meters).

FIG. 5 is a drawing that shows an example of the guidance content determination table 32.

As shown in FIG. 5, if the guidance timing distance N is less than the second distance (e.g., 500 meters), the first guidance timing at which to perform the first guidance and the second guidance timing at which to perform the second guidance as shown in FIG. 6 both become timings earlier than a timing at which the vehicle crosses into the guidance timing distance before the planned entry branch. Thus, by starting to change lanes after the first guidance and the second guidance are performed, the vehicle can complete the lane change before entering the no-lane-change zone. Accordingly, in addition to normal branch guidance, the first guidance content is set as content that provides lane change early instruction guidance which instructs the driver to change lanes before the vehicle enters the no-lane-change zone. For the normal branch guidance of the first guidance, voice guidance such as "head diagonally left 1 kilometer ahead" is performed. For the lane change early instruction guidance, voice guidance such as "change lanes before reaching the no-lane-change zone" is performed. The second guidance content is also set as content that provides the lane change early instruction guidance in addition to the normal branch guidance. For the normal branch guidance of the second guidance, voice guidance such as "head diagonally left shortly" is performed and an enlarged view of the planned entry branch is displayed on the liquid crystal display 15.

If the guidance timing distance N is equal to or greater than the second distance (e.g., 500 meters) and less than the first distance (e.g., 1,000 meters), as shown in FIG. 6, the first guidance timing at which to perform the first guidance becomes a timing earlier than the timing at which the vehicle crosses into the guidance timing distance before the planned entry branch, and the second timing at which to perform the second guidance becomes a timing later than the timing at which the vehicle crosses into the guidance timing distance before the planned entry branch. Thus, by starting to change lanes after the first guidance is performed, the vehicle can complete the lane change before entering the no-lane-change zone. Accordingly, the first guidance content is set as content that provides the lane change early instruction guidance in addition to the normal branch guidance. Meanwhile, the second guidance content cannot provide guidance related to a valid lane change, because even if the vehicle starts to change lanes after the second guidance is performed, the vehicle is predicted to enter the no-lane-change zone before completing the lane change. Thus, the second guidance content is set as content that provides only the normal branch guidance.

If the guidance timing distance N is equal to or greater than the first distance (e.g., 1,000 meters), the first guidance timing at which to perform the first guidance and the second guidance timing at which to perform the second guidance as shown in FIG. 6 both become timings later than the timing at which the vehicle crosses into the guidance timing distance before the planned entry branch. As a consequence, even if the vehicle starts to change lanes after the first guidance is performed, the vehicle is predicted to enter the no-lane-change zone before completing the lane change. Therefore, guidance based on the first guidance content is not performed at the first guidance timing (timing at which the distance from the vehicle to the planned entry branch is equal to the first distance (e.g., 1,000 meters)); instead, guidance based on the first guidance content is performed at a timing at which the distance from the vehicle to the planned entry branch is equal to the guidance timing distance. Thus, by starting to change lanes after the first guidance is performed, the vehicle can complete the lane change before entering the no-lane-change zone. Accordingly, the first guidance content is set as content that provides the lane change early instruction guidance in addition to the normal branch guidance. Meanwhile, the second guidance content cannot provide guidance related to a valid lane change, because even if the vehicle starts to change lanes after the second guidance is performed, the vehicle is predicted to enter the no-lane-change zone before completing the lane change. Thus, the second guidance content is set as content that provides only the normal branch guidance.

If it is determined that a no-lane-change zone does not exist between the vehicle and the planned entry branch located ahead in the advancing direction of the vehicle (S5: No), the first guidance content and the second guidance content are both set as content that provides only the normal branch guidance.

Next, at S8, the CPU 41 determines whether the first guidance timing at which to perform the first guidance related to a lane change is reached. Note that the first guidance timing is the timing at which the distance from the vehicle to the planned entry branch is equal to the first distance (e.g., 1,000 meters). However, if the guidance timing distance N is equal to or greater than the first distance (e.g., 1,000 meters) as described above, the CPU 41 determines at S8 whether the distance from the vehicle to the planned entry branch is equal to the guidance timing distance instead of determining whether the first guidance timing is reached.

If it is determined that the first guidance timing or the like at which to perform the first guidance is reached (S8: Yes), the first guidance is performed based on the first guidance content set at S7 (S9). The processing then proceeds to S10. However, if it is determined that the first guidance timing or the like at which to perform the first guidance is not reached (S8: No), the CPU 41 stands by until the first guidance timing or the like is reached.

At S10, the CPU 41 determines whether the second guidance timing at which to perform the second guidance related to a lane change is reached. Note that the second guidance timing is the timing at which the distance from the vehicle to the planned entry branch is equal to the second distance (e.g., 500 meters).

If it is determined that the second guidance timing at which to perform the second guidance is reached (S10: Yes), the second guidance is performed based on the second guidance content set at S7 (S11). The travel guidance processing program is then ended. However, if it is determined that the second guidance timing at which to perform the second guidance is not reached (S10: No), the CPU 41 stands by until the second guidance timing is reached.

As described in detail above, the navigation device 1 according to the present example, the travel guidance method based on the navigation device 1, and the computer program executed by the navigation device 1 can perform lane change guidance based on suitable guidance content that takes into consideration a no-lane-change zone when performing vehicle lane change guidance. This is because, if there is a planned entry branch that the vehicle is projected to enter located ahead in the advancing direction of the vehicle and there is a no-lane-change zone between the vehicle and the planned entry branch, the guidance content related to a lane change of the vehicle is set based on a positional relationship between the vehicle, the no-lane-change zone, and the planned entry branch (S7), and guidance is performed using the set guidance content (S9, S11). Thus, if the vehicle must change lanes in order to enter the planned entry branch, a suitable lane change can be made.

Based on the positional relationship between the vehicle, the no-lane-change zone, and the planned entry branch, the guidance timing distance is calculated (S6). Note that the guidance timing distance is the distance from the planned entry branch that is required for the vehicle to comfortably change lanes before entering the no-lane-change zone. The guidance content is then set based on the calculated guidance timing distance. Therefore, the lane change guidance can be performed using suitable guidance content.

If guidance is performed in the two stages of the first guidance and the second guidance, whether to perform the guidance related to a lane change in each guidance is set in consideration of the guidance timing distance. Therefore, the guidance related to a lane change is not performed at an unnecessary timing, and can be performed at a necessary timing.

If the guidance timing distance is equal to or greater than the first distance (e.g., 1,000 meters), guidance based on the first guidance content is performed at the timing at which the distance from the vehicle to the planned entry branch is determined to be equal to the guidance timing distance, and guidance based on the first guidance content is not performed at the first guidance timing. Therefore, even if the guidance timing distance is a particularly long distance, the guidance related to a lane change can be performed at a timing before the vehicle enters the no-lane-change zone. Thus, if the vehicle must change lanes in order to enter the planned entry branch, a suitable lane change can be made.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

For example, according to the present example, the guidance timing distance is a value based on the number of lanes on the road traveled by the vehicle. However, the lane currently traveled by the vehicle may be identified, and the guidance timing distance set to a value based on the number of lanes the vehicle must move in order to enter the planned entry branch. Specifically, the distance M required for the vehicle to comfortably change lanes is calculated using Equation (3) below.

$$M = V \times (T' \times S + H) \quad (3)$$

where,

T': number of lanes vehicle must move to enter planned entry branch.

Also, according to the present example, the first guidance is performed at the first guidance timing at which the distance from the vehicle to the planned entry branch is equal to 1,000 meters, and the second guidance is performed at the second guidance timing at which the distance from the vehicle to the planned entry branch is equal to 500 meters. Alternatively, the first guidance timing and the second guidance timing may be timings different from the timings described above. However, note that the first guidance timing is a timing earlier than the second guidance timing. In such case, thresholds of the guidance timing distance N in the guidance content determination table 32 should also be revised in line with the first guidance timing and the second guidance timing. For example, in a configuration where the first guidance is performed at the first guidance timing at which the distance from the vehicle to the planned entry branch is equal to L1 (the first distance), and the second guidance is performed at the second guidance timing at which the distance from the vehicle to the planned entry branch is equal to L2 (the second distance: L2<L1), the guidance content in the guidance content determination table 32 is modified such that N<L2, L2≤N<L1, and N≥L1.

According to the present example, the guidance related to a lane change is performed in the two stages of the first guidance and the second guidance. However, the guidance may be performed in one stage, or three or more stages.

According to the present example, particularly for expressways (e.g., national expressways, motor roads, and urban expressways), a branch to an access road by which the vehicle enters an SA (service area), PA (parking area), IC (interchange) or the like from a main road is considered a planned entry branch. However, a branch other than the above (e.g., an intersection of a general road, and a branch to an access road for entering an expressway from a general road) may also be considered a planned entry branch. In the case of successive branches, guidance that takes the successive branches into consideration is preferably performed.

The present example describes an example of the navigation device 1. However, the inventive principles may also be applied to a personal computer, a portable device such as a mobile telephone, and the like.

What is claimed is:

1. A travel guidance device, comprising:
   a current position detection unit; and
   a controller that:
   acquires map data including a road network;
   acquires a position of a vehicle from the current position detection unit;
   acquires a planned travel route of the vehicle;
   based on the acquired position of the vehicle, the acquired planned travel route, and the acquired map data, determines whether there is a planned entry branch that the vehicle is projected to enter located ahead in an advancing direction of the vehicle;
   when the planned entry branch is located ahead of the vehicle, determines whether there is a no-lane-change zone specified in the road network between the vehicle and the planned entry branch based on the acquired map data;

when the no-lane-change zone is located between the vehicle and the planned entry branch, sets guidance content related to a lane change of the vehicle based on a position of the no-lane-change zone;

generates guidance using the set guidance content; and communicates the generated guidance to a user of the travel guidance device.

2. The travel guidance device according to claim 1, wherein the controller:

acquires a distance from the planned entry branch to an end of the no-lane-change zone on the vehicle side as a no-lane-change start distance;

acquires a number of lanes on a road traveled by the vehicle;

calculates a guidance timing distance based on the acquired no-lane-change start distance and the acquired number of lanes; and sets the guidance content based on the calculated guidance timing distance.

3. The travel guidance device according to claim 2, wherein the controller:

acquires a distance from the vehicle to the planned entry branch;

sets a first guidance timing at which it is determined that a distance from the vehicle to the planned entry branch is equal to a first distance;

generates the guidance based on a first guidance content at the set first guidance timing;

sets a second guidance timing at which it is determined that a distance from the vehicle to the planned entry branch is equal to a second distance shorter than the first distance;

generates the guidance based on a second guidance content at the set second guidance timing;

when the guidance timing distance is less than the second distance, generates the first guidance content and the second guidance content to include guidance related to a lane change of the vehicle; and when the guidance timing distance is equal to or greater than the second distance:

generates the first guidance content to include guidance related to a lane change of the vehicle; and generates the second guidance content to not include guidance related to a lane change of the vehicle.

4. The travel guidance device according to claim 2, wherein the controller:

when the guidance timing distance is equal to or greater than the first distance:

generates the guidance based on the first guidance content at a timing at which it is determined that the distance from the vehicle to the planned entry branch is equal to the guidance timing distance; and generates the guidance to not include the first guidance content at the first guidance timing.

5. A non-transitory computer-readable storage medium storing a computer-executable travel guidance program, the program configured to cause a computer to perform the following functions:

acquiring map data including a road network;

acquiring a position of a vehicle from a current position detection unit;

acquiring a planned travel route of the vehicle;

based on the acquired position of the vehicle, the acquired planned travel route, and the acquired map data, determining whether there is a planned entry branch that the vehicle is projected to enter located ahead in an advancing direction of the vehicle;

when the planned entry branch is located ahead of the vehicle, determining whether there is a no-lane-change zone specified in the road network between the vehicle and the planned entry branch based on the acquired map data;

when the no-lane-change zone is located between the vehicle and the planned entry branch, setting guidance content related to a lane change of the vehicle based on a position of the no-lane-change zone;

generating guidance using the set guidance content; and communicating the generated guidance to a user of the travel guidance device.

6. A travel guidance method, comprising:

acquiring map data including a road network;

acquiring a position of a vehicle from a current position detection unit;

acquiring a planned travel route of the vehicle;

based on the acquired position of the vehicle, the acquired planned travel route, and the acquired map data, determining whether there is a planned entry branch that the vehicle is projected to enter located ahead in an advancing direction of the vehicle;

when the planned entry branch is located ahead of the vehicle, determining whether there is a no-lane-change zone specified in the road network between the vehicle and the planned entry branch based on the acquired map data;

when the no-lane-change zone is located between the vehicle and the planned entry branch, setting guidance content related to a lane change of the vehicle based on a position of the no-lane-change zone;

generating guidance using the set guidance content; and communicating the generated guidance to a user of the travel guidance device.

7. The travel guidance method according to claim 6, further comprising:

acquiring a distance from the planned entry branch to an end of the no-lane-change zone on the vehicle side as a no-lane-change start distance;

acquiring a number of lanes on a road traveled by the vehicle;

calculating a guidance timing distance based on the acquired no-lane-change start distance and the acquired number of lanes; and setting the guidance content based on the calculated guidance timing distance.

8. The travel guidance method according to claim 7, further comprising:

acquiring a distance from the vehicle to the planned entry branch;

setting a first guidance timing at which it is determined that a distance from the vehicle to the planned entry branch is equal to a first distance;

generating the guidance based on a first guidance content at the set first guidance timing;

setting a second guidance timing at which it is determined that a distance from the vehicle to the planned entry branch is equal to a second distance shorter than the first distance;

generating the guidance based on a second guidance content at the set second guidance timing;

when the guidance timing distance is less than the second distance, generating the first guidance content and the second guidance content to include guidance related to a lane change of the vehicle; and when the guidance timing distance is equal to or greater than the second distance:

generating the first guidance content to include guidance related to a lane change of the vehicle; and
generating the second guidance content to not include guidance related to a lane change of the vehicle.

9. The travel guidance method according to claim 7, further comprising:
when the guidance timing distance is equal to or greater than the first distance:
generating the guidance based on the first guidance content at a timing at which it is determined that the distance from the vehicle to the planned entry branch is equal to the guidance timing distance; and
generating the guidance to not include the first guidance content at the first guidance timing.

10. The storage medium according to claim 5, wherein the current position detection unit comprises one of:
a GPS sensor;
a vehicle speed sensor and a gyroscopic sensor;
a vehicle speed sensor and a steering sensor;
a GPS sensor, a vehicle speed sensor, and a gyroscopic sensor;
a GPS sensor, a vehicle speed sensor, and a steering sensor; and
a GPS sensor, a vehicle speed sensor, a gyroscopic sensor, and a steering sensor.

11. The storage medium according to claim 10, wherein the current position detection unit is a GPS sensor.

12. The storage medium according to claim 5, the program further configured to cause the computer to perform the following functions:
acquiring a distance from the planned entry branch to an end of the no-lane-change zone on the vehicle side as a no-lane-change start distance;
acquiring a number of lanes on a road traveled by the vehicle;
calculating a guidance timing distance based on the acquired no-lane-change start distance and the acquired number of lanes; and
setting the guidance content based on the calculated guidance timing distance.

13. The storage medium according to claim 12, the program further configured to cause the computer to perform the following functions:
acquiring a distance from the vehicle to the planned entry branch;
setting a first guidance timing at which it is determined that a distance from the vehicle to the planned entry branch is equal to a first distance;
generating the guidance based on a first guidance content at the set first guidance timing;
setting a second guidance timing at which it is determined that a distance from the vehicle to the planned entry branch is equal to a second distance shorter than the first distance;
generating the guidance based on a second guidance content at the set second guidance timing;
when the guidance timing distance is less than the second distance, generating the first guidance content and the second guidance content to include guidance related to a lane change of the vehicle; and
when the guidance timing distance is equal to or greater than the second distance:
generating the first guidance content to include guidance related to a lane change of the vehicle; and
generating the second guidance content to not include guidance related to a lane change of the vehicle.

14. The storage medium according to claim 12, the program further configured to cause the computer to perform the following functions:
when the guidance timing distance is equal to or greater than the first distance:
generating the guidance based on the first guidance content at a timing at which it is determined that the distance from the vehicle to the planned entry branch is equal to the guidance timing distance; and
generating the guidance to not include the first guidance content at the first guidance timing.

15. The travel guidance device according to claim 1, wherein the current position detection unit comprises one of:
a GPS sensor;
a vehicle speed sensor and a gyroscopic sensor;
a vehicle speed sensor and a steering sensor;
a GPS sensor, a vehicle speed sensor, and a gyroscopic sensor;
a GPS sensor, a vehicle speed sensor, and a steering sensor; and
a GPS sensor, a vehicle speed sensor, a gyroscopic sensor, and a steering sensor.

16. The travel guidance method according to claim 6, wherein the current position detection unit comprises one of:
a GPS sensor;
a vehicle speed sensor and a gyroscopic sensor;
a vehicle speed sensor and a steering sensor;
a GPS sensor, a vehicle speed sensor, and a gyroscopic sensor;
a GPS sensor, a vehicle speed sensor, and a steering sensor; and
a GPS sensor, a vehicle speed sensor, a gyroscopic sensor, and a steering sensor.

17. The travel guidance method according to claim 16, wherein the current position detection unit is a GPS sensor.

18. The travel guidance device according to claim 15, wherein the current position detection unit is a GPS sensor.

* * * * *